United States Patent [19]

Röhlig

[11] 4,072,616
[45] Feb. 7, 1978

[54] FILTER CARTRIDGE

[75] Inventor: Rainer Röhlig, Radevormwald, Germany

[73] Assignee: Sintermetallwerk Krebsöge GmbH, Radevormwald, Germany

[21] Appl. No.: 713,192

[22] Filed: Aug. 10, 1976

[30] Foreign Application Priority Data

Aug. 14, 1975 Germany ............................. 2536271

[51] Int. Cl.² ......................................... B01D 27/06
[52] U.S. Cl. ................................ 210/493 R; 210/496; 210/510
[58] Field of Search ............... 210/510, 493, 494, 496; 55/498, 500, 510, 521; 29/163.5 CW, 163.5 F, 420, 420.5

[56] References Cited

U.S. PATENT DOCUMENTS

| 768,951 | 8/1904 | Rawson | 210/493 |
|---|---|---|---|
| 2,186,440 | 1/1940 | Williams | 210/493 |
| 2,273,589 | 2/1942 | Olt | 210/510 |
| 2,957,235 | 10/1960 | Steinberg | 210/510 UX |
| 3,070,233 | 12/1962 | Welch | 210/493 X |
| 3,201,858 | 8/1965 | Valyi | 210/496 X |
| 3,292,792 | 12/1966 | Talhenbey et al. | 210/496 |
| 3,301,402 | 1/1967 | Talhenbey et al. | 210/496 X |
| 3,321,088 | 5/1967 | Williams | 210/496 X |
| 3,352,423 | 11/1967 | Osterman | 210/496 |
| 3,747,765 | 7/1973 | Nowak | 210/510 |

Primary Examiner—Theodore A. Granger
Attorney, Agent, or Firm—Karl F. Ross

[57] ABSTRACT

A filter cartridge comprises a body of sintered material having a star-shaped profile and a substantially constant wall thickness. The body has a folded or corrugated configuration with the corrugations extending longitudinally parallel to the axis or along a helix or screw-thread pattern. The ribs or corrugations can be symmetrical about axial planes of the body and, in an embodiment of the invention, are parallel thereto.

9 Claims, 5 Drawing Figures

FILTER CARTRIDGE

FIELD OF THE INVENTION

The present invention relates to a filter cartridge and, more particularly, to an elongated filter cartridge formed of sintered material.

BACKGROUND OF THE INVENTION

In the filtering of liquids to remove solids and, more generally particulates therefrom, for example the separation of solids from water in water-filtration systems, the separation of precipitates from chemical liquors, the separation of contaminant particles from oil (e.g. in the oil recirculation system of the automotive vehicle) and in other filtering applications it is known to provide a cylindrical filter body which is porous and is traversed by the liquid to be filtered (see German Gebrauchsmuster DT-Gbm 1 872 428). In this earlier system a cylindrical sintered body serves as the filter but is incapable of withstanding substantial tangential and radial stress so that it is not practical for use in systems in which a high-pressure differential is applied across the sintered body.

It has been proposed to increase the surface area of a filter of wire mesh, paper or fabric by folding same into a plurality of folds or corrugations. To date, however, this has not been applicable to sintered structures and such filters, because of the flexible material from which they are formed, also cannot withstand elevated pressures.

The advantages of sintered filters are numerous. For example, they may be made of sintered metal powders, sintered fibrous materials or sintered ceramics and thus may be designed to withstand a wide range of chemical attacks, high temperatures and other influences detrimental to conventional flexible folded filters.

However, until now the relative ratio of effective filtering surface area to volume or size of sintered filter bodies has been unsatisfactory, a disadvantage which together with the inability of conventional sintered filters to withstand high stresses, has limited the field of application for sintered filters.

Mention may be made of the well-known phenomenon in the structural arts that folded systems, i.e. ribbed or corrugated structures, e.g. of reinforced concrete have far greater strength than nonfolded structures (LUEGER, *Lexikon DIE BAUTECHNIK*, 1966, pages 416, 417). To date, however, these teachings have not influenced, to my knowledge, the design of filter cartridges.

OBJECT OF THE INVENTION

It is the object of the invention to provide an improved filter cartridge which retains the advantages of sintered filter bodies but obviates the disadvantages of the earlier systems described above.

SUMMARY OF THE INVENTION

This object is attained, in accordance with the present invention, in a filter cartridge having in a given volume, a large effective filter area, which comprises an elongated filter body of substantially constant wall thickness and a star-shaped rib-like profile, constituting a so-called "folded" structure. The term "folded" is here used to describe a ribbed arrangement in which a plurality of ribs project generally radially (as seen in cross-section) and define troughs between them, the ribs extending longitudinally and either being straight, i.e., parallel to the axis, or lying along respective helices in a screw-thread pattern.

The term "folded" is used here in the sense of the LUEGER concept and characterizes a configuration in which the ribs or corrugations are capable of taking up all radial compression stresses when, in use, the structure is subjected to a high-pressure differential thereacross.

Best results are obtained when the folded troughs and crests extend parallel to the axis of the cartridge, a configuration which can be fabricated particularly simply.

According to a feature of the invention, which is most advantageous when high stresses are applied because of pressure differentials across the sintered wall of the filter, the folds have planes of symmetry which lie along respective radii and thus are axial planes, with the walls of each individual fold being symmetrical with respect to this plane and hence lying substantially in planes parallel to the plane of symmetry. The folds thus have substantially radial inner flanks and substantially radial outer flanks, the outer extremities of the walls of each fold being bridged by a cylindrical-arc segment or a polygonal bight. Similarly, the troughs between successive ribs may be formed by polygonal wall portions or cylindrical arc segments.

This latter embodiment of the invention is not only advantageous from the point of view of static strength but has been found also to be highly functional since the results in a very large filter surface per unit volume of the cartridge.

When the cartridge is to be formed as a flow through structure with minimum axial flow resistance, I have found it to be advantageous to provide an embodiment in which the folds are formed with walls inclined to their respective axial planes of symmetry and thus wherein the walls, in radial cross-section lie along divergent secants. The walls of each fold are externally bridged by circular arc segments or polygonal bight portions as previously described and the proximal walls of adjoining ribs can likewise be bridged by polygonal or sintered arc segments.

In all cases, however, the wall thickness of the ribbed portion of the sintered body should be constant.

It has been found to be advantageous to provide the ribs with an average thickness which is approximately three times the wall thickness thereof. On the average, therefore, the width of the axial passage between the walls of each rib is equal to the wall thickness thereof.

The body may be provided with a headpiece which is sintered to the body or can be formed integrally therewith during the sintering process by a connecting flange.

The advantages of the structure described above are numerous. For example, for the first time it is possible to form a filter cartridge of sintered material which is comparable to the folded filters hitherto constructed of flexible materials from the point of view of geometry and filtering effects. Thus, a large effective filtering area in a given volume can be attained.

Moreover, the filter cartridge and filter body is structurally stable to resist substantially any of the stresses resulting from the application of high-pressure differentials thereacross.

It is an especially important advantage that the entire folded filter body can be made simply by pressing the sinterable material against a form with isostatic pressure and thereafter sintering same. The sinterable material which is used can be metallic sinter powder and fibers although it is also possible to use sinterable fiber/wire mixtures or ceramic materials.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
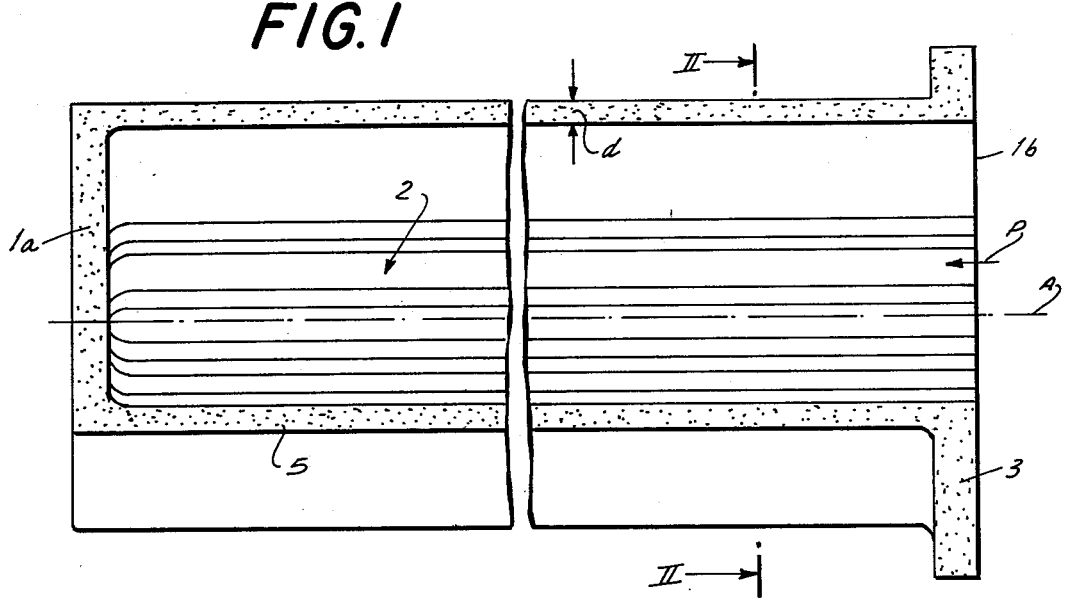
FIG. 1 is an axial cross-sectional view through a filter cartridge of the one-end type according to the invention.

In FIG. 1 I have shown a filter cartridge which comprises a generally tubular filter body 1 closed at one end 1a by a liquid-permeable wall and integrally, unitarily formed from sintered metal, e.g. nickel particles. A filter of this type may be used as a so-called filter core.

The body 1 is open at 1b so that it can be connected to a pipe or other fitting. The connection may be formed by a headpiece here constituted as a flange 3 and unitarily from sintered material together with the remainder of the body. The body has, apart from the headpiece, a uniform wall thickness $d$. The filter shown in FIG. 1 may be used at the intake side of a pump adapted to dispense gasoline, to displace water or to circulate oil, e.g. as a contaminant-removing filter in which solids are trapped along the external surface of the porous body.

Figure 2:
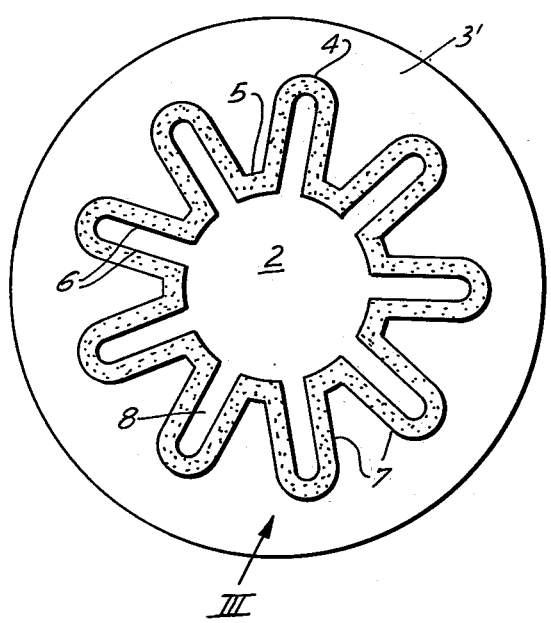
FIG. 2 is a section taken along the line II — II of FIG. 1.

As will be apparent from FIGS. 1 and 2, the filter body 1 is formed as a closed folded structure with folds in a star-pattern in profile, the crests 4 and the valleys 5 extending parallel to the axis $a$ of the elongated body.

Figure 3:
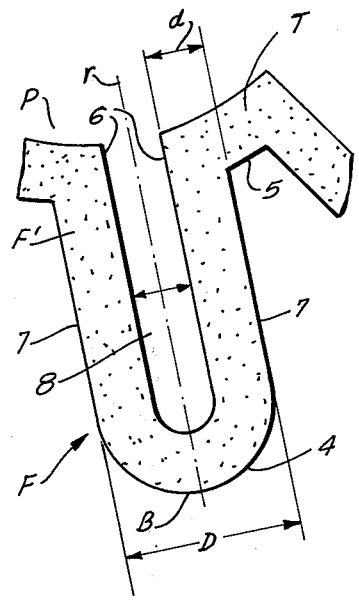
FIG. 3 is a detail view, drawn to an enlarged scale of the region represented at III of FIG. 2.

As seen in cross-section, each fold F is constituted by a pair of folded walls F' and F" and, in the embodiment of FIGS. 1 - 3, these walls F' and F" are parallel to one another. They are thus symmetrical with respect to a radius $r$ from the axis $a$ and hence to an axial plane perpendicular to the plane of the paper in FIG. 3 along the radius $r$.

The fold walls F' and F" have thus substantially radial inner flanges 6 and substantially radial outer flanges 7, the walls F' and F" being bridged outwardly by semi-circular segments B forming the crests 4. Inwardly, the troughs or valleys 5 are formed with circular arc segments T, the latter being centered upon the axis $a$. The interior of the body thus defines a passage P which communicates with the axially extending passages 8 in each of the folds. The passage 8 can have a width $w$ which is approximately equal to the wall thickness $d$ and the width of the fold D can be equal approximately to three times the thickness $d$.

Figure 4:
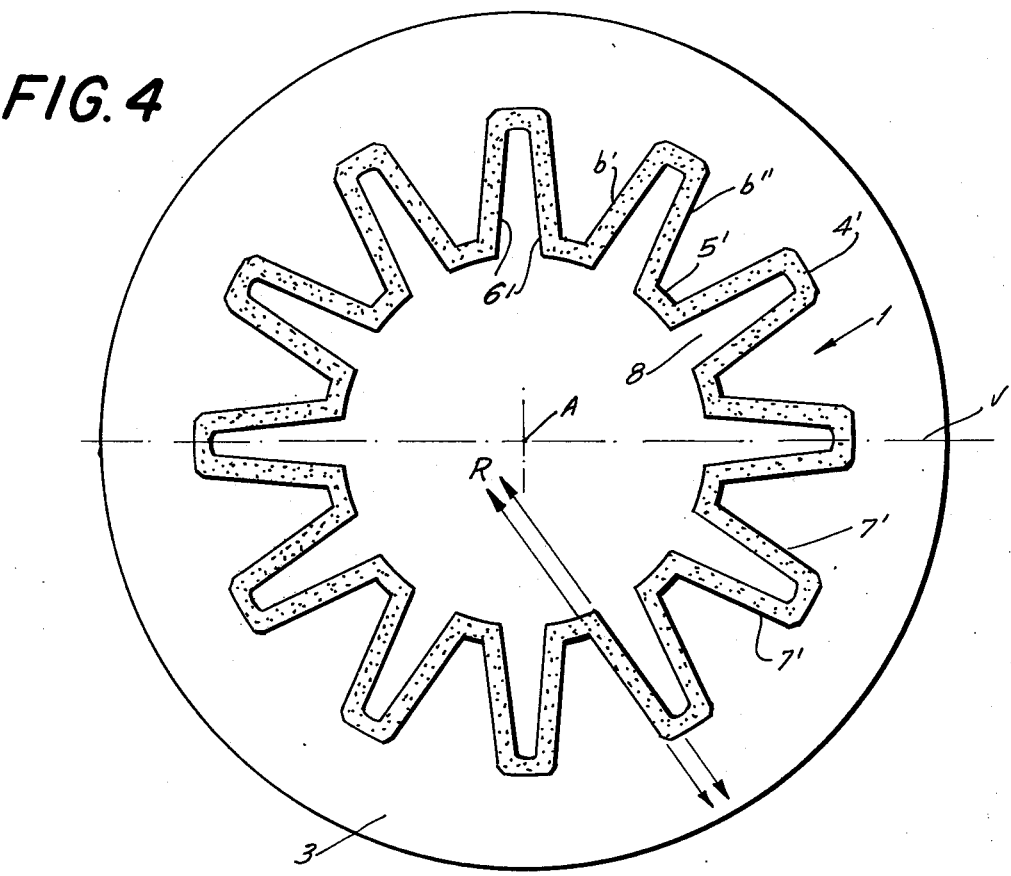
FIG. 4 is a cross-sectional view similar to FIG. 2 through a flowthrough filter cartridge according to another embodiment of the invention.

In the embodiment of FIG. 4, the crests 4' of the folds are polygonal or beveled and the walls F' and F" converge outwardly, also symmetrical to the symmetry plane $r$.

The inner and outer flanges 6', 7', here extend along secants R with respect to a circle centered on the axis $a$. The inner segments 5' defining the valleys are also polygonal.

Figure 5:
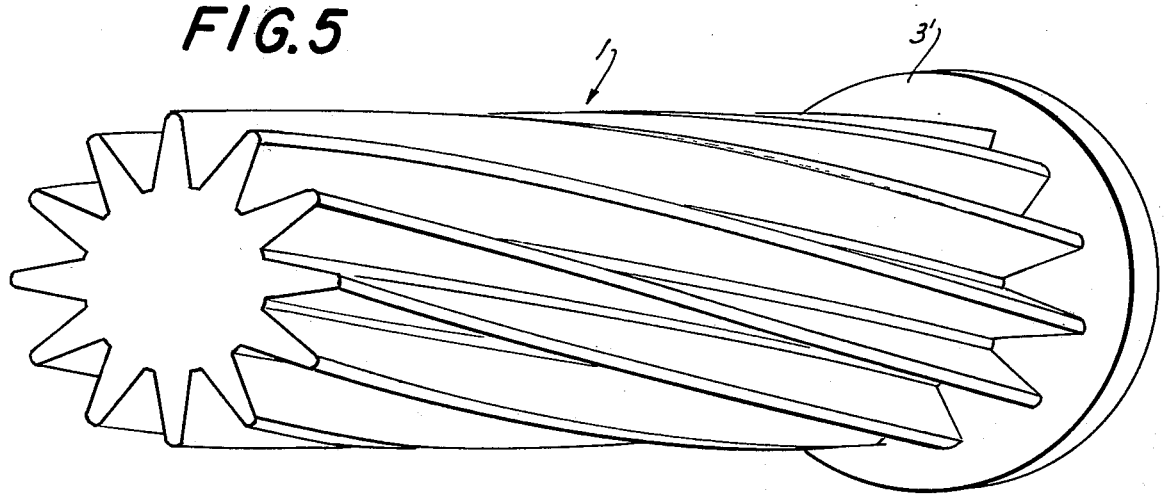
FIG. 5 is a perspective view of a portion of another filter cartridge embodying the invention.

FIG. 5 shows an arrangement similar to that of FIG. 4 wherein, however, a separate headpiece 3' is sintered to the sintered body 1' and the folds F' extend helically along the body.

I claim:

1. A filter cartridge comprising an elongated porous filter body of sintered metal closed at one end and formed with a plurality of folds in a star-like profile and of uniform cross section and constant wall thickness, said folds extending along the length of said body, and a flange formed unitarily with said body of said sintered metal at the other end of said body, the walls of said folds merging into said flange at said other end, in cross section, each of said folds having a pair of walls bridged externally with a connecting portion and wherein proximal walls of successive folds are bridged by further portions, said folds having a mean width approximately equal to three times the thickness of said walls of said folds.

2. The cartridge defined in claim 1 wherein said folds extend parallel to the axis of said body.

3. The cartridge defined in claim 1 wherein said folds extend helically along said body.

4. The cartridge defined in claim 1 wherein at least some of said portions are in cross-sectional circular arc segments.

5. The cartridge defined in claim 1 wherein at least some of said portions are, in cross-section, polygonal.

6. The cartidge defined in claim 1 wherein said walls of each fold converge outwardly.

7. The cartridge defined in claim 1 wherein said walls of each fold are mutually parallel.

8. The cartridge defined in claim 1 wherein said walls lie along secants to a circle sintered on the axis of said body in cross-section.

9. The cartridge defined in claim 1 wherein the walls of each fold define between them a flow passage having a mean width approximately equal to the thickness of said walls.

* * * * *